United States Patent [19]

Södler et al.

[11] Patent Number: 4,566,548
[45] Date of Patent: Jan. 28, 1986

[54] ANALYTICAL BALANCE

[75] Inventors: Walter Södler, Göttingen; Erich Knothe, Bovenden; Günther Maaz, Uslar-Wiensen; Joachim Mädge, Brunswick, all of Fed. Rep. of Germany

[73] Assignee: Sartorius GmbH, Fed. Rep. of Germany

[21] Appl. No.: 644,344

[22] Filed: Aug. 27, 1984

[30] Foreign Application Priority Data

Aug. 27, 1983 [DE] Fed. Rep. of Germany ....... 3330988

[51] Int. Cl.$^4$ ............... G01G 3/08; G01G 21/00; G01G 21/10; G01G 1/18
[52] U.S. Cl. ................... 177/229; 177/128; 177/187; 177/246
[58] Field of Search ........ 177/191, 212, 128, 187–189, 177/229, 246

[56] References Cited

U.S. PATENT DOCUMENTS 3,547,213 12/1970 Knothe et al. ............... 177/191 X
4,136,750 1/1979 Strickler ........................ 177/189
4,433,740 2/1984 Lüchinger ..................... 177/229 X Primary Examiner—E. A. Goldberg
Assistant Examiner—Patrick W. Foster
Attorney, Agent, or Firm—Eric P. Schellin

[57] ABSTRACT

In an analytical balance with a pan and a four-bar mechanism which keeps the balance pan parallel horizontally during its vertical travel, the one vertical side of which is held fast to the housing, the other vertical side of which, in the form of a coupling piece, carries an extension which receives the pan, and both horizontal sides of which are connected in an articulated manner by an upper and a lower rod to the vertical sides, whereby the four-bar mechanism is loaded by the restoring force of a load converter, the extension (16) which receives the pan (17) is L-shaped, the horizontal L-shank (pan arm) (16″) carries the pan (17) rigidly connected to its free end and the vertical L-shank (bearing arm) (16′) is mounted on the bar (18‴) of a U-shaped arm bearing (18) which projects above and below over the vertically movable end (9) of the four-bar mechanism (5, 6, 7, 8, 9) with its two horizontal U-shanks (18, 18″) in the rod planes and is rigidly fastened to it in two vertically superposed bearings (118′). Such a construction avoids the introduction of damaging torques from the extension (16) and the balance pan (17) into the sensitive parallel guide (5, 6, 7, 8, 9).

8 Claims, 6 Drawing Figures

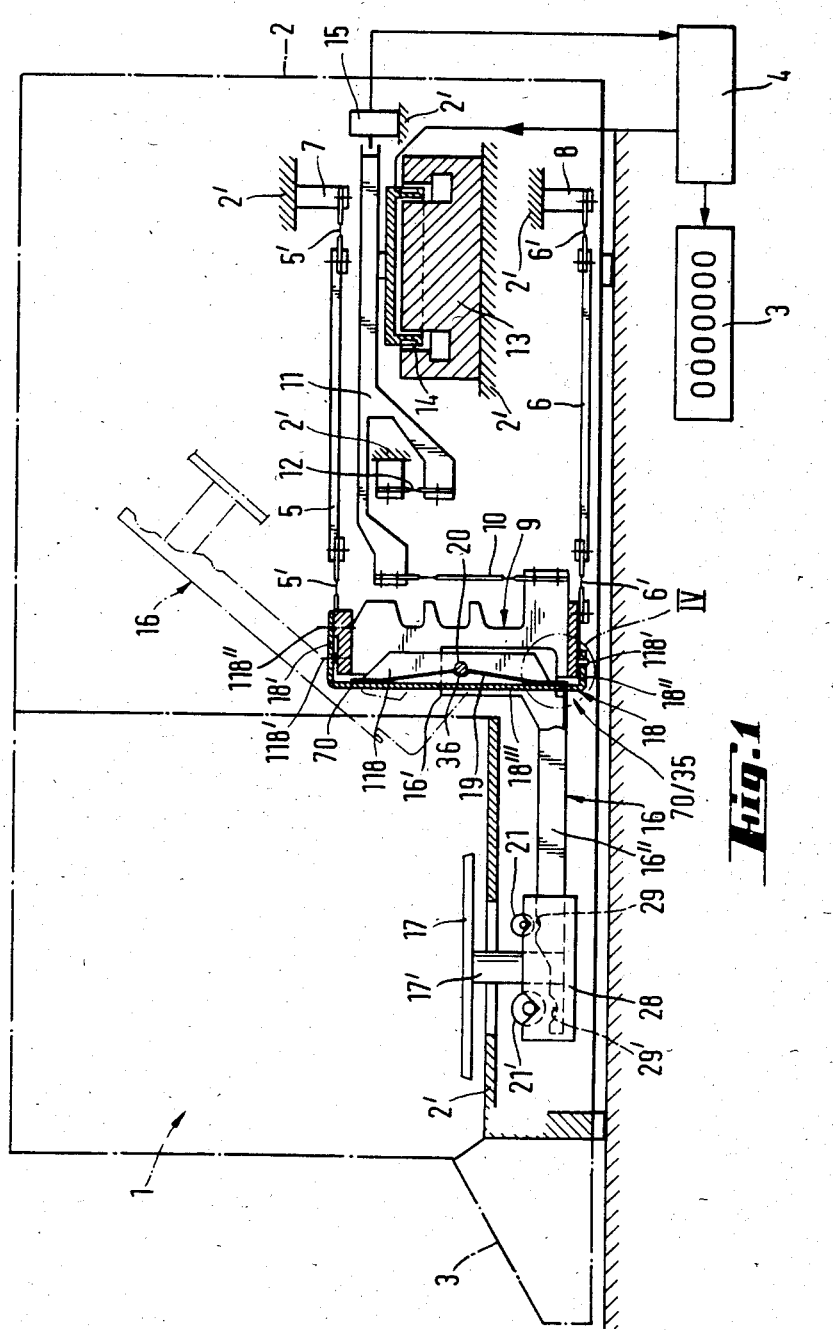

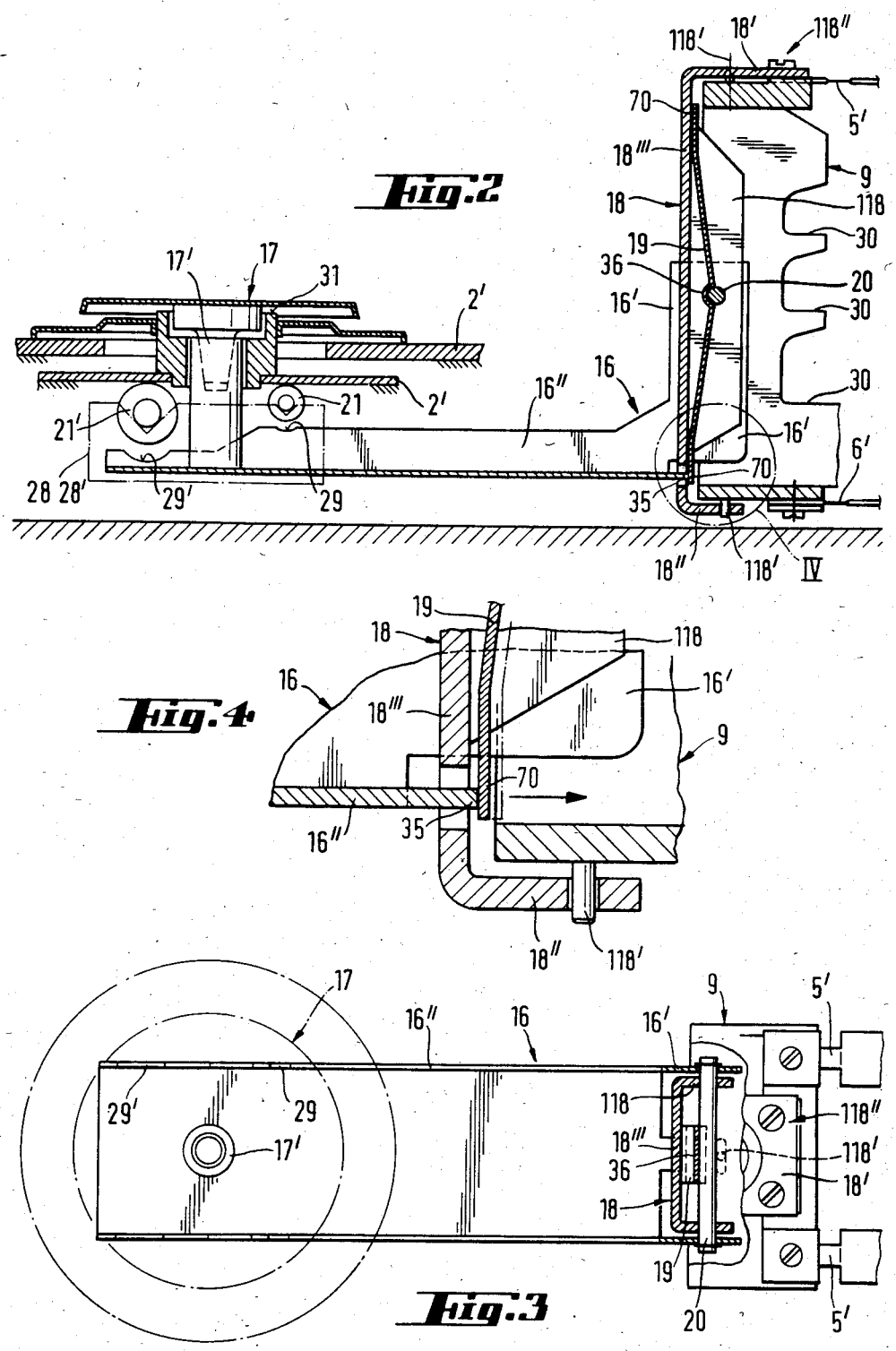

ANALYTICAL BALANCE

BACKGROUND OF THE INVENTION

The invention concerns an analytical balance with a four-bar mechanism which keeps the balance pan parallel horizontally during its vertical travel, the one vertical side of which is held fast to the housing, the other vertical side of which in the form of a coupling piece carries an extension which receives the scale, and both horizontal sides of which are connected in an articulated manner by an upper and a lower rod to the vertical sides, whereby the four-bar mechanism is loaded by the restoring force of a load converter. Such analytical balances are known in the literature, e.g.:

Swiss patent No. 397,262
United Kingdom No. 7,112,179;
DE-OS No. 3,114,103;
DE-GM No. 82 03 807.4;
DE-GM No. 82 03 094.4.

One or more regulating weights are positioned directly under the scale for regulating the balance. These regulating weights can be coupled by a raising mechanism for the regulating process in a loading manner to the scale carrier and are disengaged, thus removing the load, for normal weighing operations. It is also known that so-called substitution weights can be positioned directly under the pan on the pan carrier in order to extend the weighing range in a substituting manner by disengaging corresponding individual substitution weights from the pan carrier as the load increases.

The positioning of an extension or bracket for receiving the pan has certain constructional, formational and operational advantages compared with the positioning of the load scale directly in the axis of the load receiver or coupling piece in the four-bar mechanism. There is, however, the danger in the selection of such a contruction principal that damaging torques can be initiated in the sensitive bending springs via the deformation of the coupling piece due to the bracket and the behaviour of the balance in the case of off-center loads on the scale becomes unfavorable, that is, the so-called corner load behaviour becomes worse.

In a known analytical balance of the type initially mentioned the extension is mounted over the lower rod plane to the coupling piece, while the bearing consists of two short brackets projecting on both sides on the coupling piece toward the actual extension. The actual extension is supported on both sides on these brackets. The extension consists of two bars which enclose the cross-section of the coupling piece and are supported on the short brackets by means of two cross-pieces. The extension is mounted on the coupling piece so that it can pivot in a limited horizontal manner in order to take up any lateral jolts acting on the scale. These bearings offer additional moments of danger and increase the sensitivity of the construction to corner loads acting on the pan.

SUMMARY OF THE INVENTION

The present invention therefore has the task of achieving in an analytical balance of the type initially mentioned a better introduction of force from the pan onto the parallel guide and especially of preventing damaging torques from entering into the articulations of the parallel guide and thus increasing the corner load sensitivity of the balance.

The invention solves this task as follows: The extension which receives the pan is constructed in an L-shape, the horizontal L-shank (scale arm) carries the scale rigidly connected to its free end and the vertical L-shank (bearing arm) is mounted on the bar of a U-shaped arm bearing which extends with its two horizontal U-shanks over the vertically movable end of the four-bar mechanism in the rod planes and is fastened to the latter in two bearings located vertically over one another, the upper one of which is screwed on and the lower one of which can pivot about a vertical axis within the scope of the elastic twisting range of the arm bearing.

The advantage of such an arrangement is the fact that the introduction of force on the pan occurs in the rod plane, so that no moments and forces are introduced onto the coupling piece piece and no troublesome flexing of the coupling piece occurs. This arrangement also makes it possible to achieve a good regulation of the pan both horizontally and vertically. Another advantage is the insensitivity of the pan to lateral jolts as a consequence of the elastic twistability of the arm bearing.

The advantages of this construction are also preserved if the regulating weights are positioned directly under the pan and load the extension at times. Moreover, the coupling piece is free for additionally receiving substitution weights which are positioned with advantage directly in the vertical axis of the load receiver or of the coupling piece.

BRIEF DESCRIPTION OF THE DRAWINGS

The concept of the invention, which can take many embodiments, is explained in more detail in a preferred embodiment with reference made to the drawings.

FIG. 1 is a schematic side view or a vertical section through the analytical balance with the housing indicated.

FIG. 2 is a vertical section through the L-shaped extension with coupling piece on an enlarged scale.

FIG. 3 is a top view of the L-shaped extension.

FIG. 4 is a detailed section through the knee of the L-shaped extension and its meshing into an overload safety mechanism.

DETAILED DESCRIPTION OF THE INVENTION

Figure 6:
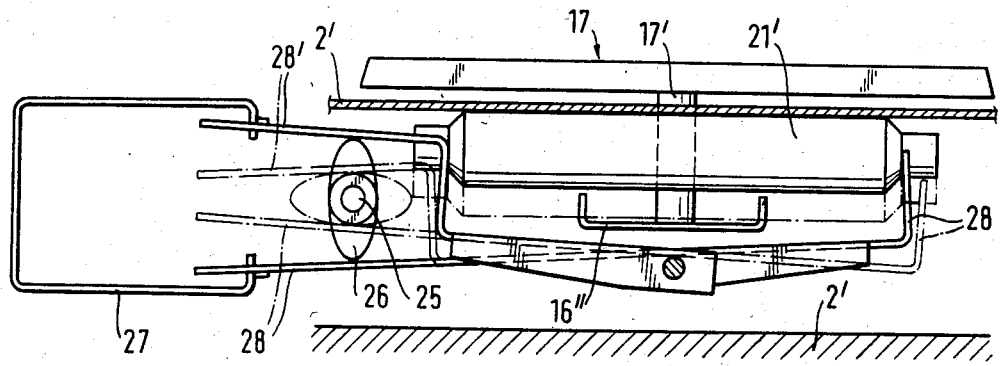
FIG. 6 is a front view of the lifting mechanism.

According to FIG. 1 the balance operates on the principle of electromagnetic load compensation such as is known in the prior art cited initially. The mechanical members consist of a four-bar mechanism which consists of an upper rod 5 with a triangular, trapezoidal or rectangular cross section and with articulations 5' which is suspended on bearing blocks 7 on points 2' fixed to the housing and is connected by other articulations 5' to vertically directed coupling piece 9. Coupling piece 9 is also mounted with lower rod 6 with articulations 6' on corresponding bearing blocks 8, so that four-bar mechanism 5, 5', 6, 6', 7, 8, 9 is formed which can move vertically, limited by stops, within the range of coupling piece 9 and carries balance pan 17 with carrier pins 17' in extension 16. Weighing area 1 is surrounded by housing 2. Digital display 3 on the front is connected electrically via an electric circuit and control 4 to position sensor 15 and magnetic system 13, 14. Moreover, translation lever 11 is mounted on coupling piece 9 in an articulated manner by connecting articulation 10, which is itself articulated via suspension 12 to fixed points 2' of the housing and carries coil 14 on its rear end which moves into the magnetic field of permanent magnet 13. When a load is placed on pan 17 or when regulating weights 21 are put on, coil 14, through which current is passing, produces a load-proportional counterfource in the field of permanent magnetic system 13 which is digitalized via bearing sensor 15 and evaluation and control electronic circuitry 4 and displayed in display unit 3. Compare the state of the art represented by DE-OS No. 31 44 103.

In FIGS. 2 and 3, the extension 16 is constructed in accordance with the invention in an L-shape viewed from the side, and horizontal L-shank (scale arm) 16" carries pan 17 rigidly connected to its free end, and vertical L-shank (bearing arm) 16' is mounted on bar 18''' of U-shaped arm bearing 18, which projects above and below over vertically moveable end 9 of four-bar mechanism 5, 6, 7, 8, 9 with its two horizontal U-shanks 18', 18" in the rod planes, preferably in the planes of spring articulations 5', 6' and is fastened to it in two vertically superposed bearings 118', 118".

As FIG. 2 shows, bearing arm 16' has lateral bearing sheets which surround beveled bearing sheets 118 of arm bearing 18 and are connected to each other by pivot axis 20. Leaf spring 19 is located between pivot axis 20 and bar 18''' of U-shaped arm bearing 18, the free ends 70 of which are supported on the arm bearing. The bend of the leaf spring is supported on horizontal pivot axis 20.

As FIG. 4 shows, the knee of extension 16 extends with a nose through an opening of arm bearing 18 and is supported on the lower free end of leaf spring 19 in an elastic manner. L-shaped extension 16, arm bearing 18 and leaf spring 19 interposed between them are parts of an overload safety mechanism against vertically acting overloads on pan 17. In the load range the leaf spring forms a rather rigid support and in the overload range a limitedly flexible support for scale arm 16". In the case of an overload, extension 16 pivots slightly about its pivot axis 20, whereby the free end of spring 19 is deflected to the right under the pressure of the nose on the scale arm and thus protects the sensitive rod mechanism from overload shocks. In addition, pan 17 strikes against stop 31 fixed to the housing, thus taking the load off extension 16. Lower U-shank 18" of U-shaped arm bearing 18 is formed on coupling piece 9 by hole-pin bearing 118' and upper U-shank 18' is formed as regulating bearing 118" for the height, lateral and parallel regulation of pan 17. Force is introduced approximately in the planes of leaf-shaped spring articulations 5', 6' of both rods 5, 6 and in the vertical system axis of the coupling piece, so that no damaging forces, especially torques, can act on it and lead to a troublesome flexing. Moreover, a simple possibility of regulating pan 17 is achieved in this way in order to be able to reach the lateral and vertical distance to the housing perforations.

Recesses 30 for receiving roller-shaped substitution weights are provided on coupling piece 9 so that when additional regulating weights are used under pan 17 a compact construction is still assured for the weighing system.

Figure 5:
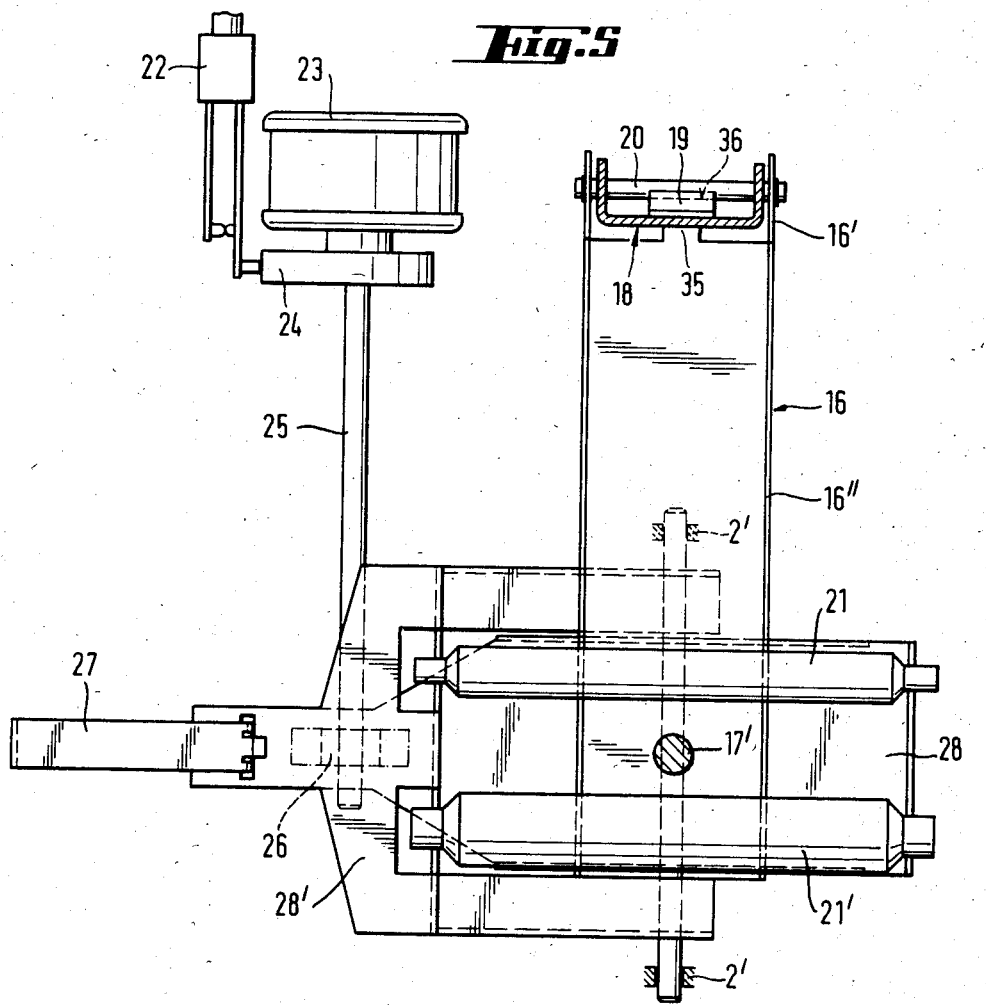
FIG. 5 is a schematic top view of the lifting mechanism for the regulating weights.

As FIG. 2 shows, regulating weight 21 with a weight of e.g. 30 g and regulating weight 21' with a weight of e.g. 120 g in the shape of a roller are located directly under pan 17 and are stopped at stops 2' fixed to the housing by the lifting mechanism shown in FIGS. 5 and 6, so that the scale arm is not loaded (as is shown) for the transport or the weighing of material. The one or the other weight can be selectively or conjointly lowered into recesses 29, 29' of the scale arm by the lifting mechanism shown in FIGS. 5 and 6, so that the balance can be regulated for the next weighing operation. The lifting mechanism consists of electric switch 22 which is positioned on the outside of the housing and cuts in electromotor 23 with switch contacts 24. The motor carries lifting cam 26 on its camshaft 25 which, depending on the position, actuates lifting forks 28 and 28' for both regulating weights 21 and 21', thus lowering regulating weights 21, 21' in succession onto scale arm 16" or lifting them off it and pressing them against stops 2' fixed to the housing in accordance with FIG. 2. Spring 27 assures that lifting forks 28, 28' are in constant contact with shift cam 26.

In order to simplify the assembly, disassembly and regulation of lifting mechanism 22, 23, 24, 25, 26, 27, 28 and of regulating weights 21, 21', L-shaped extension 16 can pivot upward abouts its horizontal transversal axis 20 by somewhat more than 90°, as is indicated in FIG. 1, so that the mechanism located under it becomes accessible.

What is claimed is:

1. Analytical balance with pan on top with a four-bar mechanism which keeps the balance pan parallel horizontally during its vertical travel, the one vertical side of which is held fast to the housing, the other vertical side of which, in the form of a coupling piece, carries an extension which receives the pan, and both horizontal sides of which are connected in an articulated manner by an upper and a lower rod to the vertical sides, whereby the four-bar mechanism is loaded by the restoring force of a load converter, characterized in that the extension (16) which receives the pan (17) is L-shaped, the horizontal L-shank (16") carries the pan (17) rigidly connected to its free end and the vertical L-shank bearing arm (16') is mounted on the bar (18''') of a U-shaped arm bearing (18) which projects above and below over the vertically movable end (9) of the four-bar mechanism (5, 6, 7, 8, 9) with its two horizontal U-shanks (18, 18") in the rod planes and is rigidly fastened to it in two vertically superposed bearings (118').

2. Analytical balance according to claim 1, characterized in that the L-shaped extension (16) with its vertical shank bearing arm (16') on its free end carried on the arm bearing (18) by means of a horizontal transversal axis (20) which goes through side flanges (118) of the U-shaped arm bearing (18), and the L-shaped extension (16) can pivot for assembly and regulation by means of regulating weights (21, 21') located under the load pan (17) and the load arm (16") and by means of their moving mechanism (25, 26, 27, 28) about its horizontal transversal and bearing axis (20) by somewhat more than 90° upward in the direction of the upper bearing point of the arm bearing (18).

3. Analytical balance according to claim 2, characterized in that the L-shaped extension (16), the arm bearing (18) and a leaf spring (19) positioned between them are parts of an overload safety mechanism against vertically acting overloads.

4. Analytical balance according to claim 3, characterized in that the leaf spring (19) runs parallel to the arm bearing (18) and to the bearing arm (16') and is convexly curved, whereby the bend of the curvature is supported against the pivot axis (20) of the extension (16), the free ends are supported against the arm bearing (18), and the lower end of the leaf spring (19) facing the knee of the extension (16) forms a semirigid support in the load range and a limitedly flexible support in the overload range for the pan arm (16").

5. Analytical balance according to claim 4, characterized in that the coupling piece (9) has bearings (30) for roller-shaped substitution weights.

6. Analytical balance according to claim 5, characterized in that the lower bearing point (18") of the U-shaped arm bearing (18) is formed on the coupling piece (9) by a longitudinal hole-pin bearing and the upper bearing point (18") is formed as a regulating bearing for the height, lateral and parallel regulation of the pan (17).

7. Analytical balance according to claim 6, characterized in that the free end of the pan arm (16') has two cuplike recesses (29, 29') for two roller-shaped regulating weights (21, 21') which can be lowered by a moving mechanism (22, 23, 24, 25, 26, 27, 28) onto the pan arm (16') to increase the load and raised against a support (2") fixed to the housing to remove load.

8. Analytical balance according to claim 7, characterized in that the moving mechanism (22, 23, 24, 25, 26, 27, 28) for the regulating weights (21, 21') is formed by a motor-driven cam drive (23, 24, 25, 26) with lifting forks (27, 28) which extend under the regulating weights (21, 21').

* * * * *